United States Patent [19]

Rauscher, Jr.

[11] Patent Number: 5,427,334

[45] Date of Patent: Jun. 27, 1995

[54] METHOD FOR MAKING NONMETALLIC PRESSURE VESSEL WITH INTEGRAL PROPELLANT MANAGEMENT VANE, AND PRESSURE VESSEL MADE BY THE METHOD

[75] Inventor: Robert A. Rauscher, Jr., Lawrenceville, N.J.

[73] Assignee: Martin Marieta Corporation, East Windsor

[21] Appl. No.: 122,627

[22] Filed: Sep. 17, 1993

[51] Int. Cl.$^6$ .............................................. B64D 37/08
[52] U.S. Cl. .......................... 244/135 R; 244/158 R; 220/563
[58] Field of Search ............... 244/135 R, 158 R, 172; 220/562, 563

[56] References Cited

U.S. PATENT DOCUMENTS

| | | | |
|---|---|---|---|
| 3,286,878 | 11/1966 | Schadt et al. | 244/135 B |
| 3,744,738 | 7/1973 | Howard | 244/135 R |
| 4,898,030 | 2/1990 | Yeh | 244/135 R |
| 4,957,157 | 9/1990 | Dowdy et al. | 165/104.27 |
| 4,994,749 | 2/1991 | Davies et al. | 324/637 |
| 5,279,323 | 1/1994 | Grove et al. | 244/135 R |

*Primary Examiner*—Galen L. Barefoot
*Attorney, Agent, or Firm*—W. H. Meise; C. A. Berard; S. A. Young

[57] ABSTRACT

A method for making a storage tank with an integral vane starts with a feed pipe. A thin, flat vane has a shape which defines an inner and outer curve extending between attachment and second ends. The outer curve of the vane is dimensioned to lie just within the inner periphery of the tank, spaced therefrom by a particular gap. The attachment end of the vane is affixed to a first part of a coupling region of the feed pipe, with the pipe axis lying in the plane of the vane. The vane-pipe combination is placed in the cavity of a mold having the desired interior shape of the tank, with the edge of the outer curve of the vane spaces away from the wall of the mold by the desired gap. A dissolvable, hardenable liquid is injected into the mold and hardened. The mold is removed, leaving a soluble mandrel in the shape of the cavity of the tank. A copper coating is applied to the mandrel and the pipe, to form a metal liner including a neck extending over the feed pipe. A composite reinforcing shell is applied over the liner, after which solvent is passed through the feed pipe to dissolve the mandrel, leaving a reinforced, metal-lined cavity including the vane. In one embodiment of the invention, the vane is supported at the second end by attachment to the liner

17 Claims, 6 Drawing Sheets

METHOD FOR MAKING NONMETALLIC PRESSURE VESSEL WITH INTEGRAL PROPELLANT MANAGEMENT VANE, AND PRESSURE VESSEL MADE BY THE METHOD

This invention relates to strong, lightweight pressure vessels generally useful for storage of fluids, and especially adapted for, in a spacecraft, storage or propellants and pressurants. More specifically, the invention relates to arrangements for affixing metallic tubing to nonmetallic pressure vessels.

Composite materials such as fiber-reinforced resins have been found to be noncorrosive, and to provide great strength for their weight. Composite materials such as fiberglass-reinforced epoxy have found wide use for in-ground gasoline storage tanks and swimming pools, and for other uses such as boat hulls and automobile body parts. Such tanks, hulls and auto-body parts may be made by lining a mold with fiberglass cloth, followed by impregnation with a resin, and curing. When such tanks are to be connected to a fill or drain pipe, it is common to thread the interior of an aperture in the tank, and to attach a pipe by screwing it into the threaded aperture, using pipe dope, polymer tape sealant, or the like to provide a fluid-tight seal.

Such tanks may be required to contain fuel, oxidizer, or a monopropellant such as hydrazine (together referred to as propellants). Such tanks are ordinarily pressurized with a gas such as helium when the propellant is to be used, and are not thereafter depressurized until the propellant is exhausted. The helium pressurant must also be contained in a tank. Some spacecraft may have a design lifetime of ten or more years. Therefore, the propellant and pressuring gas tanks must hold pressure without leaking for a long period of time. Spacecraft require extremely lightweight, reliable components. It has been found that graphite fiber reinforced epoxy is a desirable construction material for spacecraft propellant tanks because of its strength and low weight. It is believed that threaded pipe joints undesirably cut the reinforcing fibers, or may work loose under the vibration attendant upon vehicle launch, or due to spacecraft flexure during attitude control and/or stationkeeping maneuvers. An improved pressure-vessel-to-feed-pipe connecting arrangement is desired.

Coriolis forces tend to cause circulation of the fluid in a propellant tank on spacecraft which rotate, even in spacecraft, such as geosynchronous communications satellites, in which the rate of rotation is as small as once per day. This circulation may result in formation of a vortex in the fluid, which in turn might result in allowing pressurizing gas, rather than liquid propellant, to be ingested by the propellant delivery (feed) pipe to the associated thruster. In an extreme case, the pressurant gas might be vented, and become completely exhausted, while the tank remained full of liquid propellant. Such unpressurized propellant could not be used for spacecraft maneuvers. Thin, lightweight vanes made from Titanium or stainless steel are commonly inserted into tanks to break up or prevent liquid circulation. These vanes are ordinarily designed to perform additional functions in that they form part of a transmission line for propellant level measuring, as described in U.S. Pat. No. 4,994,794, issued Feb. 19, 1991 in the name of Davies et al. U.S. Pat. No. 4,957,157, issued Sep. 18, 1990, describes a liquid storage tank in the context of a coolant storage, which describes another function which can be performed by the vanes, in that they contain channels along their edges, dimensioned to take advantage of the surface tension of the stored liquid, to draw and guide the liquid toward the outlet. To aid one or more of these additional functions, the outermost edges of the vanes are spaced away from the walls of the tank by a gap.

SUMMARY OF THE INVENTION

A method for making a propellant storage tank with an integral propellant management vane includes the step of procuring a feed pipe with a bore defining an axis, an attachment end including a coupling region including first and second portions, with the first portion adjacent the attachment end, and the second portion remote from the attachment end. A thin, flat or planar propellant management vane is made, which has a shape in its plane which defines an attachment end and a second end, and an inner and outer curve extending between the attachment and second ends. The outer curve of the vane is dimensioned to lie just within the inner periphery of the tank, spaced therefrom by a particular gap. the attachment end of the vane is affixed to the first portion of the coupling region of the feed pipe, with the axis of the pipe lying in the plane of the vane, to form a completed propellant management arrangement on the attachment end of the feed pipe. The propellant management arrangement is placed in the cavity of a mold shaped to the desired interior shape of the tank being made, with the edge of the outer curve of the vane spaced away from the wall of the mold by the desired gap. A dissolvable hardenable liquid mandrel material is injected into the mold, and then hardened. The mold is removed, leaving a soluble mandrel in the shape of the cavity of the desired tank. If necessary to the following coating step, the mandrel is flashed with an electrically conductive layer. A ductile metal such as copper is applied in a thin coat extending over the mandrel and the adjacent second portion of the coupling region of the pipe, thereby forming a metal tank liner including a neck portion extending over the feed pipe. A composite reinforcing shell is applied over the ductile metal liner, after which a solvent is passed through the feed pipe to dissolve the mandrel, leaving a reinforced, metal-lined cavity including the propellant management vane. In one embodiment of the invention, the vane is supported at the second end by attachment to the liner under the composite shell. In another embodiment, the attachment end of the vane is affixed to a propellant management device, which in turn is affixed to the attachment end of the pipe.

DESCRIPTION OF THE INVENTION

Figure 1:
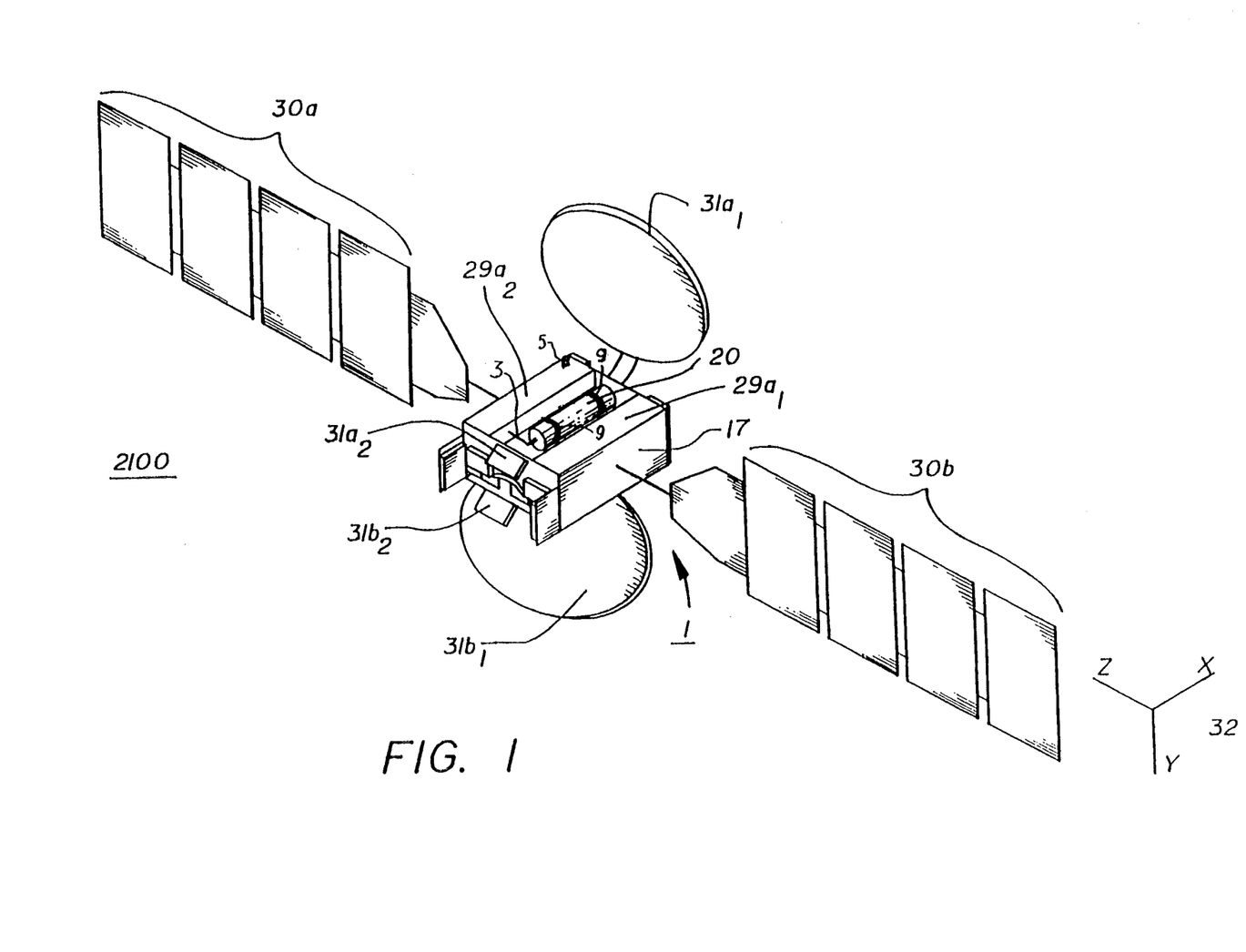
FIG. 1 illustrates a spacecraft and a tank according to the invention.

FIG. 1 illustrates a spacecraft designated generally as 2100, as described in copending patent application Ser. No. 07/948,230, filed Sep. 26, 1992 in the name of Homer et al., now U.S. Pat. No. 5,344,104 issued Sep. 6, 1993. As described therein, spacecraft 2100 includes unfurled four-section solar panels designated 30a and 30b, a body designated generally as 1, including access panels 29a1 and 29a2, a propellant tank 20 held in place by straps 9, and a first antenna system including dual-polarization reflector 31a1 and its feed 31b1, and second antenna system reflector 31b1 and its feed 3162. Spacecraft 2100 of FIG. 1 may additionally include other propellant and/or pressuring gas tanks, not visible in FIG. 1. Spacecraft 2100 also includes a plurality of engines or thrusters, one of which is illustrated as 5, which is connected by spacecraft plumbing, illustrated as 3 in FIG. 1 to propellant tanks, including tank 20 of spacecraft 2100.

Figure 2A:
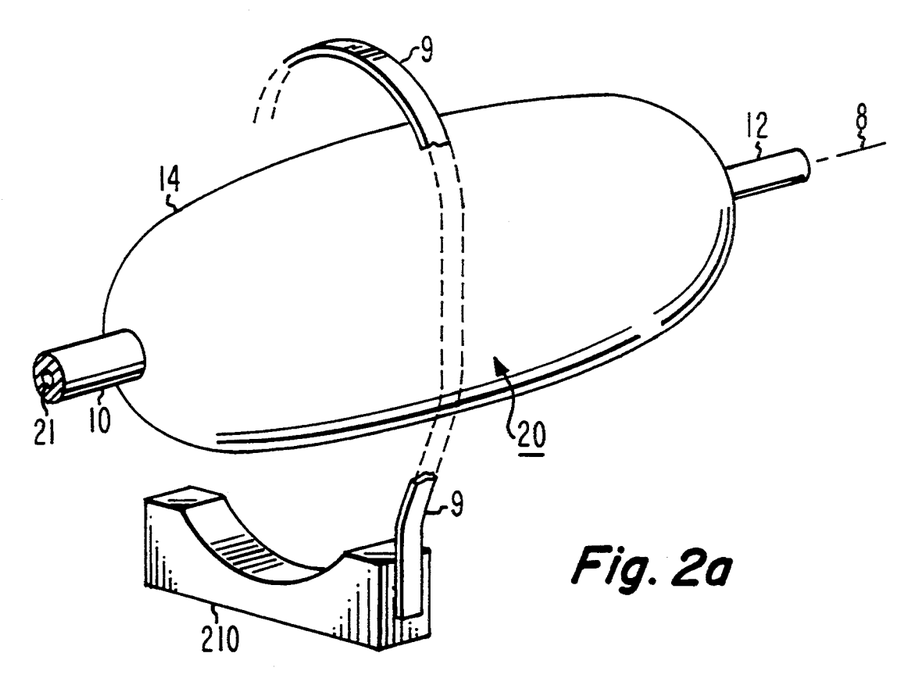
FIG. 2a is a simplified perspective or isometric view of a tank and feed pipe according to the invention.

FIG. 2a is a perspective or isometric view of a propellant or pressuring gas tank according to the invention, which may be used in spacecraft 2100 of FIG. 1. In FIG. 2, body 14 of tank 20 is affixed to first and second feed pipes 10 and 12 which are mutually coaxial about an axis 8, and which provide access by means of bores, one of which is designated 21, to the interior of the tank. As described in more detail below, the visible portion of tank body 14 is of a fiber-reinforced epoxy composite material.

FIG. 2a also shows one possible arrangement including a saddle and strap for holding tank 20 to body 1 of spacecraft 2100 of FIG. 1. In FIG. 2a, a saddle 210 is adapted to be mounted on body 1 and incudes a surface curved to fit tank 20, and also holds retaining strap 9.

Figure 2B:
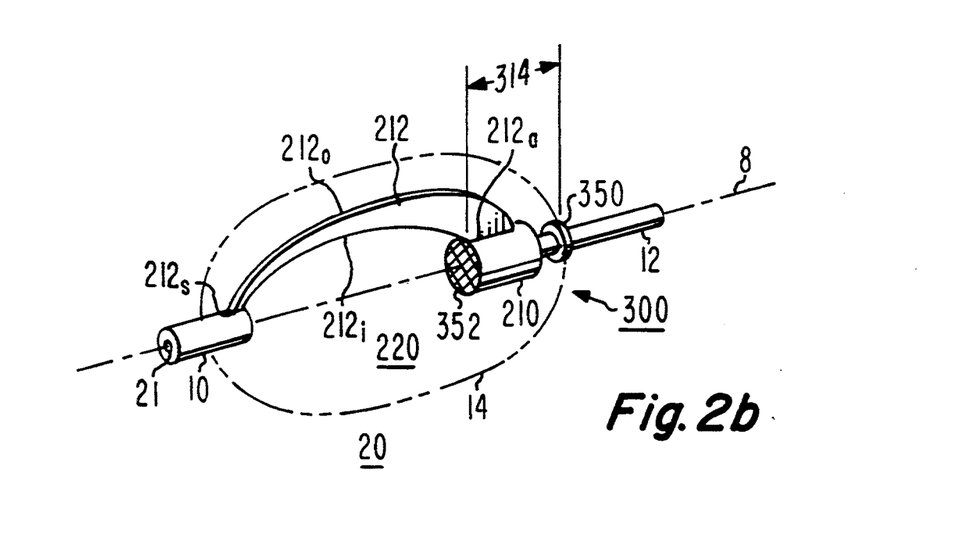
FIG. 2b illustrates structure with the body of the tank removed, showing a vane.

FIG. 2b illustrates structure within tank body 14 of FIG. 2a. Elements of FIG. 2b corresponding to those of FIG. 2a are designated by like reference numerals. In FIG. 2b, the attachment end 300 of pipe 12 includes an annulus or ring protruding from its outer surface, and also includes a propellant management device 210 affixed to the end of pipe 12. Propellant management device 210 is similar to a filter, in that it contains a fine-mesh material 352 which tends to prevent movement of particles from the interior of the tank into pipe 12, but the mesh material may also function as a wick when in contact with other such material, or with a channel dimensioned to cause propellant to adhere by surface tension, as described below. A thin, flat propellant management vane, which may be made from titanium, stainless steel or other materials, is affixed to pipe 12 by way of propellant management device 210. Vane 212 conceptually defines a plane (not separately illustrated), even though the vane is three-dimensional in that it has a finite thickness. Vane 212 is oriented so that longitudinal axis 8 of pipe 12 lies in the plane of the vane. Thus, vane 212 lies along a plane which is radial to axis 8. the combination of vane 212 with device 210 constitutes a complete propellant management arrangement 220 affixed to a coupling region 316 at the attachment end 300 of pipe 12. Those skilled in the art know that it may be desirable to use more than one vane such as vane 212, but only one is illustrated for simplicity.

Figure 3:
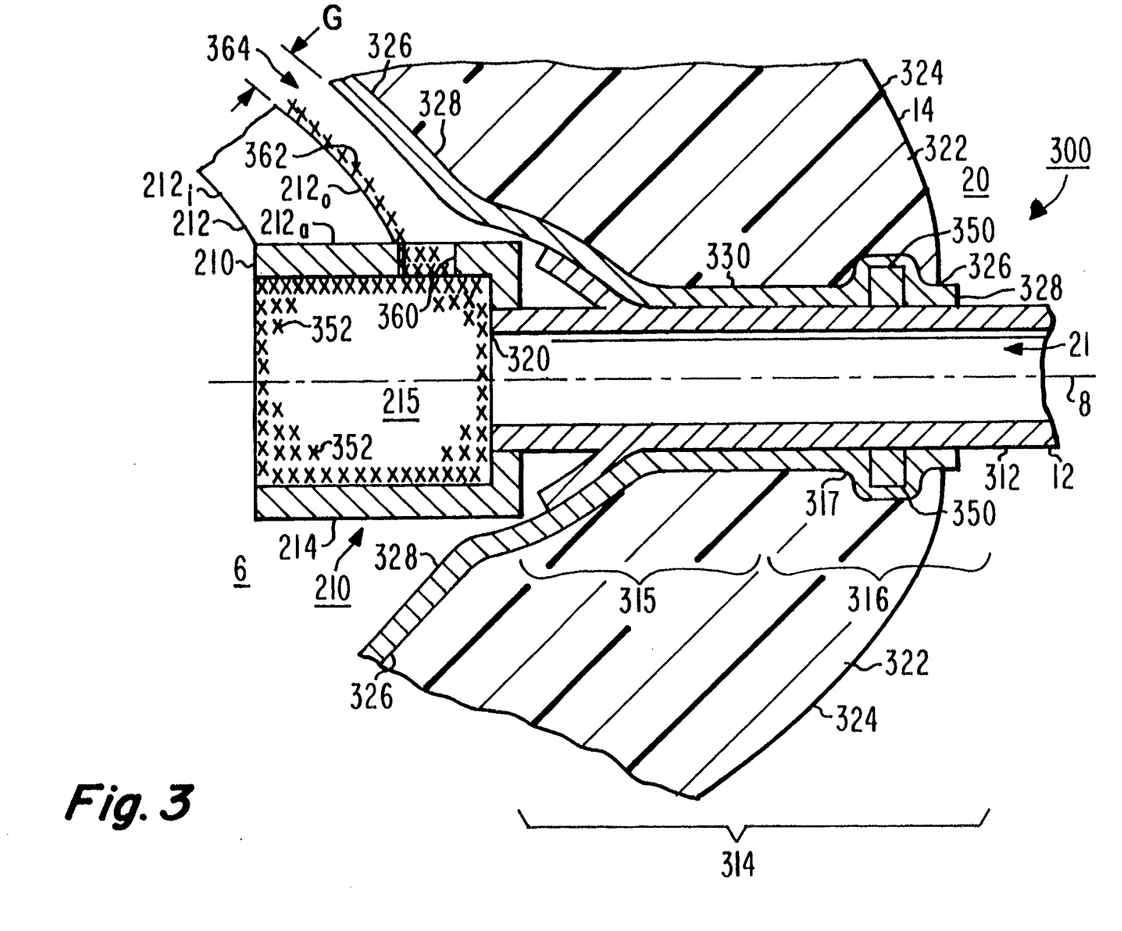
FIG. 3 is a simplified cross-sectional view of the attachment or coupling between the tank and feed pipe of FIG. 2, and the attachment of a vane internal to the tank.

FIG. 3 is a cross-section of the attachment end, designated generally as 300, of pipe 12 of FIG. 2 to tank 14, to propellant management device 210 and vane 212. Elements of FIG. 3 corresponding to those of FIGS. 1, 2a and 2b are designated by like reference numbers. The tank cavity is to the left in FIG. 3 and is designated generally as 6. As illustrated, pipe 12 is centered on longitudinal axis 8 and has a bore 21. The outer surface of pipe 12 is designated 312. As illustrated, pipe 12 is attached to tank body 14 over an attachment region 314. Within attachment region 314, pipe 12 includes a portion 316 in which the outer surface is generally cylindrical. The most distal (leftmost) end pipe 12, designated 320, extends into a socket in propellant management device 210, and is fastened thereto, as by welding.

An annular steel ring 350 is welded to outer surface 312 of pipe 12 in cylindrical portion 316 of attachment region 314 of pipe 12 to tank body 14.

In the cross-section of FIG. 3, body 14 of tank 20 may be seen to be principally composed of composite material 322, which is preferably graphite-epoxy. Tank body 14 has an outer surface 324, and an inner surface 326 which is in intimate contact with a ductile copper tank liner 328 over a portion 315 and portion 316 of attachment region 314. Copper tank liner 328 extends over the inner surface 326 of composite tank body 14, and includes a neck portion 330 which extends between composite body 14 and the combination of pipe 12 and annular ring 350 in region 315 and 316, and is exposed at the right of FIG. 3, where pipe 12 enters tank body 14. The structure as so far described is constructed as described below in conjunction with FIGS. 4a–4f.

Pipe-to-tank attachment 300 as described resists relative longitudinal motion of pipe 12 relative to tank body 14. Forces tending to push the pipe into the tank, and pressure within the tank tending to push the pipe out of the tank react against annular ring 350 and are resisted.

Propellant management device 210 of FIG. 3 principally consists of a hollow body 214 defining a cavity 215 opening into cavity 6 of the tank at its left end, and into bore 21 of feed pipe 12 at its right end. The interior of cavity 215 of device 210 contains wire-mesh or equivalent wicking material 352 illustrated by x's, which tends to prevent passage of gas bubbles. Attachment end 212a of vane 212 is firmly affixed, as by welding, to the upper side (as seen in FIG. 3) of device 210. As illustrated, vane 212 is dimensioned and located so that a gap 364 with lateral dimension G occurs between curved outer edge $212_o$ of the vane and the inner surface of copper tank liner 318, where the word "inner" means that surface facing into tank cavity 6. As is known in the art, this dimension may be selected to aid in wicking propellant toward propellant management device 210. As an aid to drawing every bit of propellant from the tank cavity, propellant management device 210 includes a side aperture 360, which opens cavity 215 to a location adjacent to gap 364, and which is filled with wicking material in contact with further wicking material 362 affixed to the edge of outer curve $212_o$ in gap 364.

Figure 4A:
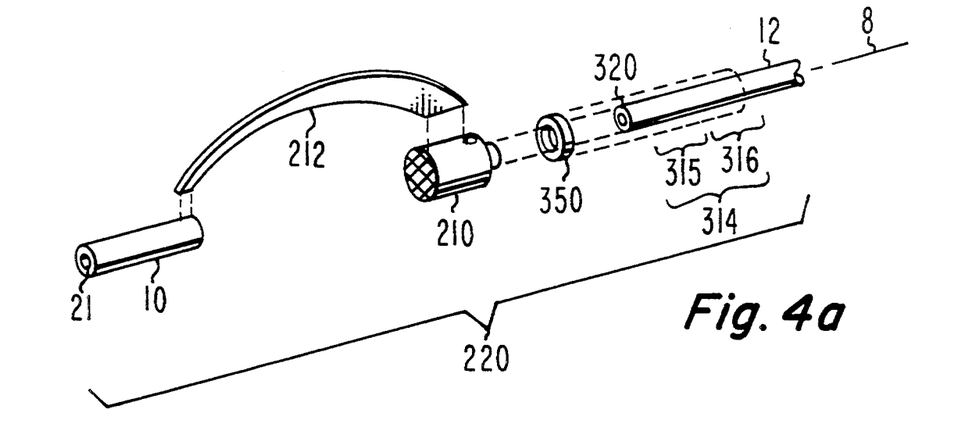
FIG. 4a is an exploded view including the vane of FIG. 3.

FIGS. 4a–4f illustrate steps in the fabrication of a tank such as that of FIGS. 2a and 3. Elements of FIGS. 4a–4f corresponding to those of FIGS. 1, 2a, 2b, or 3 are designated by like reference numerals. FIG. 4a is an exploded perspective or isometric view of the separate parts which are assembled to form the completed propellant management arrangement 220, illustrated in FIG. 2b. The separate feed pipes 10 and 12, device 210 and vane 212, are preferably held in a jig (not illustrated) during assembly, to guarantee the desired spacings. The parts may be brazed or welded together, or may even be cast as an integral unit, if desired.

Figure 4B:
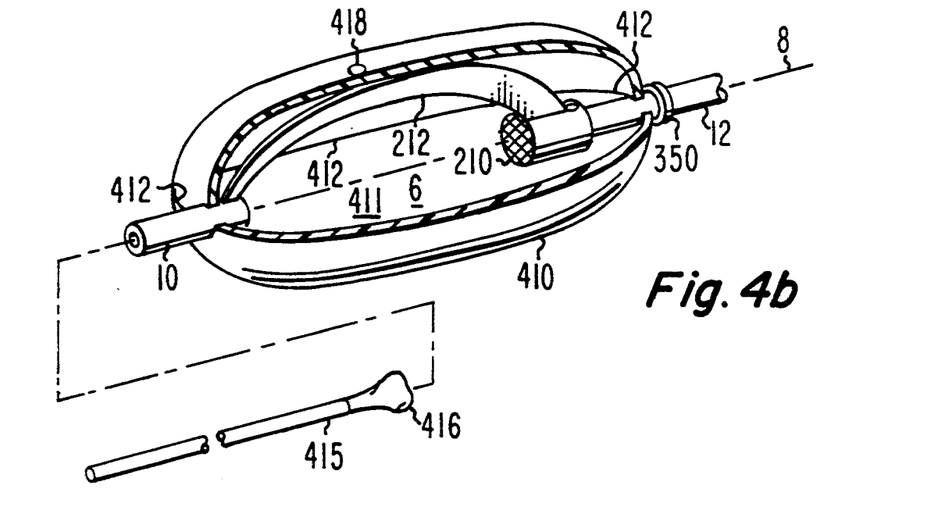
FIG. 4b illustrates the assembly of FIG. 4a in a mold.

FIG. 4b is a perspective or isometric view, partially cut away to show interior details, and represents placement of the completed propellant management arrangement 220 of FIG. 2b in the cavity 411 of a clamshell mold 410. Mold 410 opens along a parting line 412. After the mold is closed, a deflated balloon 414 on the end of a small pipe 416 may be inserted through pipe 10 and inflated, to take up some internal volume, and to plug the base of pipe 10. An expandable plug (not illustrated) is inserted through the bore of pipe 12 to plug the interior, to prevent leakage of mold material from the feed pipe. Thereafter, fluid mold material, such as liquid LEXAN is introduced through apertures in mold 410, such as aperture 418 of FIG. 4b. The mold material is solidified, in the case of LEXAN by allowing it to cool. The clamshell mold is opened and removed, to produce the structure of FIG. 4c.

Figure 4C:
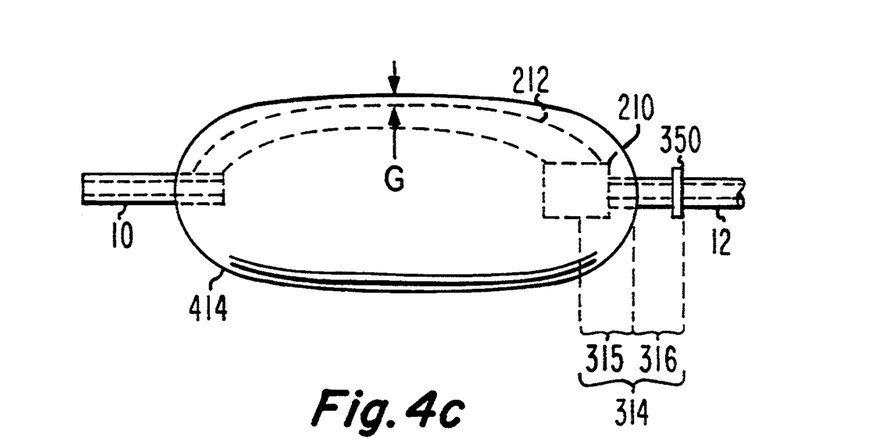
FIGS. 4c–4f illustrate steps in the fabrication of the tank and feed pipe attachment of FIGS. 2 and 3.

FIG. 4c is a side elevation view, which represents a soluble mandrel casting 414 within which the propellant management device of FIG. 2b is embedded. In FIG. 4c, the edge of outer curve $212_o$ is seen to be below the outer surface of mandrel body 414 by gap dimension G. If necessary to the following coating operation, the outer surface of mandrel body 414 is flashed with electrically conductive material, as by metal sputtering, metal evaporation, or electroless methods. Following the steps described in conjunction with FIG. 4c, the outer surface of mandrel body 414, and portions of the adjacent pipes 10 and 12, are coated with ductile metal, as suggested by arrows, some of which are designated 428. A preferred method for coating is to electroplate copper onto the surfaces. Those portions of pipe 10 the left of dash-line 426, and those portions of pipe 12 to the right of dash-line 430, are masked to prevent application of the coating metal, so that it does not interfere with later welding operations, by which the feed pipe or pipes (10, 12) of the tank are connected to the spacecraft plumbing. The resulting metal coating corresponds to ductile metal liner 328 of FIG. 3 in the completed tank.

Figure 4D:
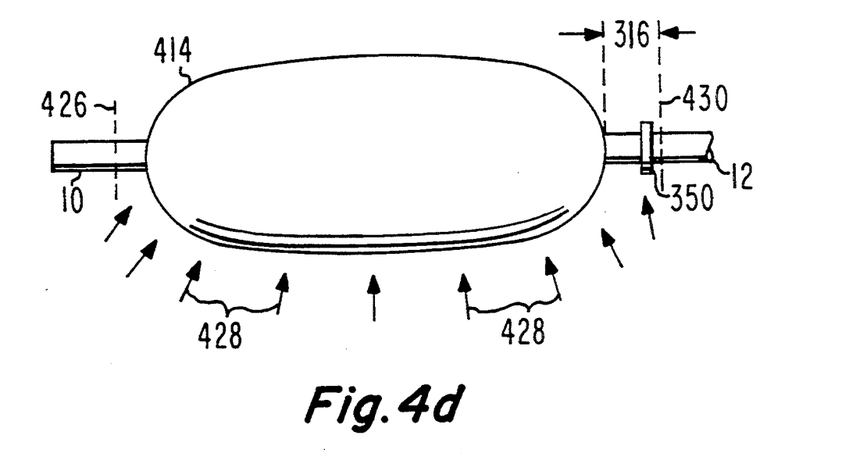
Figure 4E:
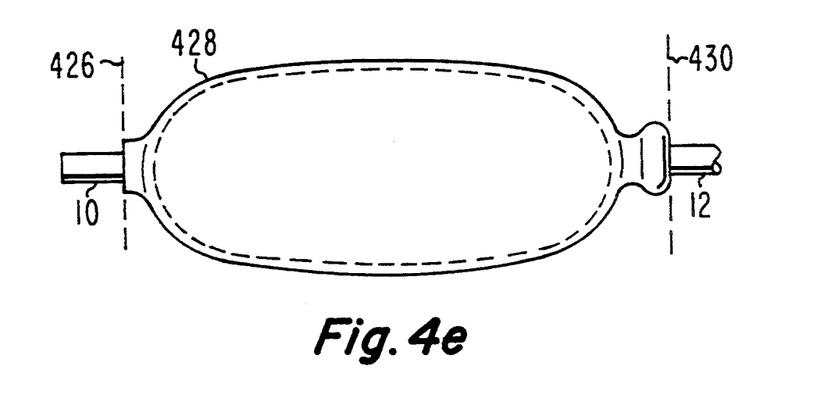
Figure 4F:
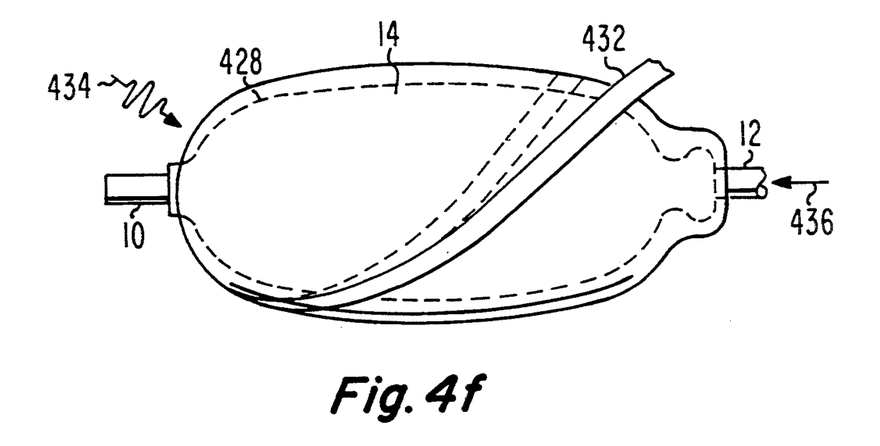

Following the coating step represented by FIG. 4d, the coated mandrel illustrated in FIG. 43 is inspected, then surrounded by a rigid composite shell reinforcement. In principle, a hard, preformed shell could be attached, but it might not fit the metal liner exactly. Instead, the metal-coated mandrel is surrounded by a flexible reinforcement material, either preimpregnated with partially cured resin, or impregnated with uncured resin after application. A preferred method is to tightly wind the metal-coated mandrel with preimpregnated graphite-fiber yarn or tape 432, as suggested by FIG. 4f, to form an uncured outer shell. The epoxy is then cured, as by application of heat, represented in FIG. 4f by photon symbol 434, to form composite outer reinforcing shell 14, also visible in FIG. 3. The mandrel is then removed by flowing a solvent through pipe 12, as suggested by arrow 436; methylene chloride is a suitable solvent for LEXAN.

After the tank and its attachments are completed, it may be tested under pressure. The completed tank may be installed in spacecraft 2100 of FIG. 1, held in place, for example, by the saddle-type clamping scheme illustrated as FIG. 2. Pipe 12 of attachment 300 is then welded to a corresponding terminus of the spacecraft plumbing 3, for ultimate connection to engine 5 of FIG. 1. Other connections are made, as necessary, to complete the attachment.

Figure 5:
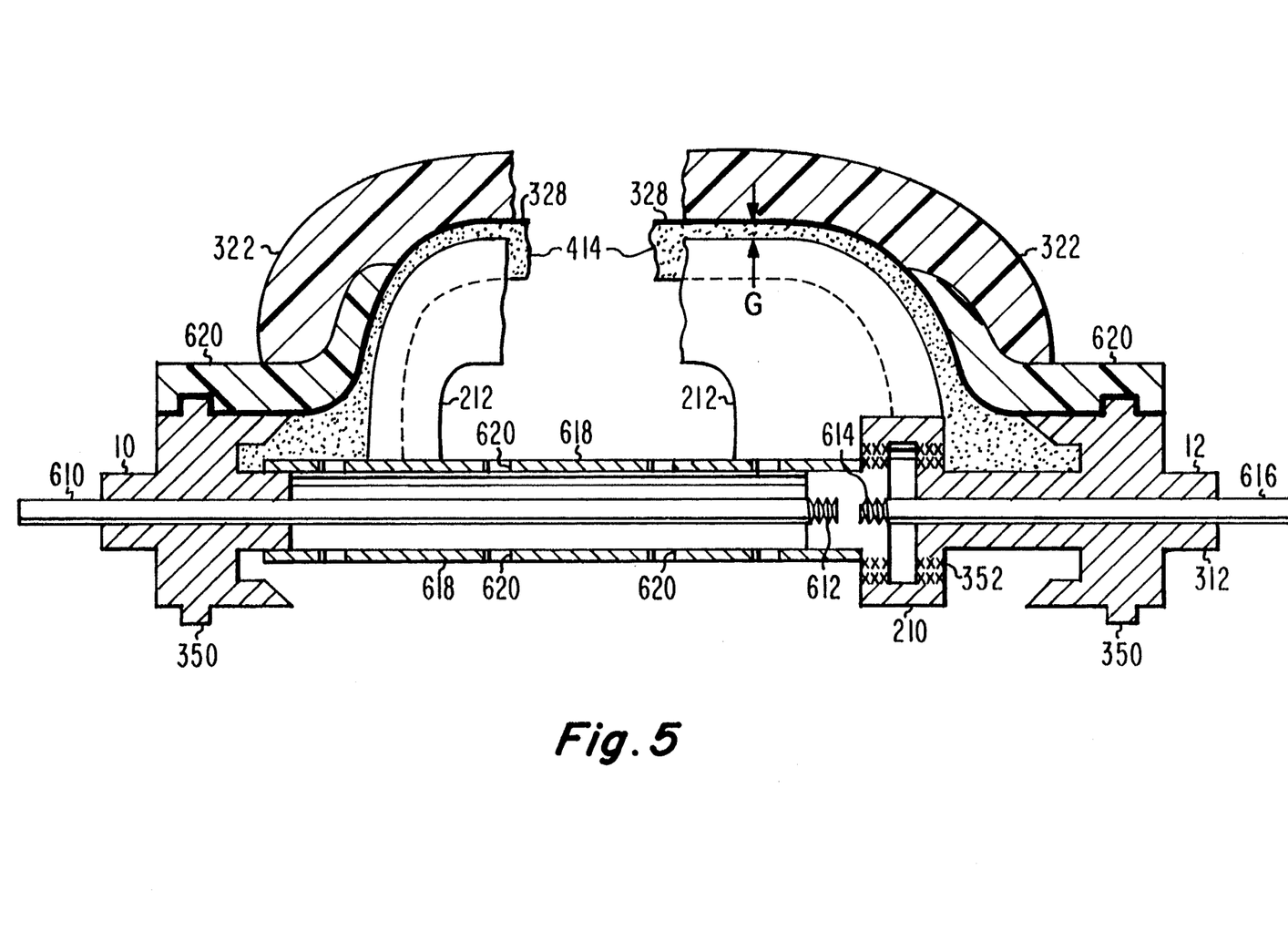
FIG. 5 is a cross-sectional view illustrating how turning rods are affixed to the structure to aid in winding reinforcement.

FIG. 5 is a cross-section illustrating how turning rods are affixed to the mandrel to aid in rotating the structure during winding of the reinforcing filaments of composite overwrap 322. In FIG. 6, a central support tube 618 includes a plurality of apertures 620. Central support tube is affixed at its right end to propellant management device 210, and at its left end makes a sliding fit with pipe structure 10, which is rendered rigid by the plated tank liner 328 and overwrap 322. A first turning rod 610 is fitted through the base of pipe 10 and tube 618, with a threaded end 612 screwed into a corresponding threaded aperture in propellant management device 210. Similarly, a threaded end 614 of a second turning rod 616 extends through the base of pipe 12 and is threaded into a corresponding threaded aperture in device 210. A preimpregnated tape or filament region 622 is wound at each end of the mandrel, and the main portion of the composite overwrap 328 is then wound.

Other embodiments of the invention will be apparent to those skilled in the art. For example, annular ring 350 may be formed integral with pipe 12 by machining from a block of metal or from a pipe no smaller in diameter than the diameter of the ring, or the ring may be brazed on, or even built up on the exterior of the pipe by electrodeposition. Instead of winding with fiber tape, the composite reinforcing exterior may be made by spraying onto the prepared mandrel illustrated in FIG. 4c a mixture of liquid epoxy filled with chopped fiber reinforcement material. As a further alternative, the mandrel could be wound with a reinforcing fiber cloth, either preimpregnated with resin or followed by impregnation and curing. While a saddle clamp is suggested for holding the tank to the spacecraft, projecting supports may be interwound into the composite tank body if desired. Chemical compatibility of the ductile metal liner and the fluid to be stored may be critical for certain applications. Other metallic elements such as gold or aluminum may be more suitable than copper for particular embodiments and can also be vapor or electrodeposited in place of or as an inner layer to the copper. Metal alloys may also be used to replace elemental metals if necessary via vapor deposition or other processes.

What is claimed is:

1. A method for making a fluid storage tank defining a tank cavity with an inner periphery, and including a propellant management vane within said tank cavity and spaced from the walls of said tank cavity by a predetermined gap, said method comprising the steps of:

producing a metal feed pipe including a bore defining a longitudinal axis, and also defining a coupling region at an attachment end of said pipe, said coupling region including a first portion adjacent said attachment end of said pipe and a second portion remote from said attachment end of said pipe, said second portion of said coupling region including a substantially cylindrical outer surface portion;

forming a propellant management vane lying generally in a plane, said vane having a generally semicircular shape in said plane, edges of said generally semicircular vane defining an attachment end and a second end, said edges of said vane also defining an outer curve and an inner curve extending between said attachment and second ends, said edge of said vane defining said outer curve being curved in a manner similar to that of a portion of said inner periphery of said tank cavity;

attaching said attachment end of said vane to said first portion of said coupling region of said pipe, with said longitudinal axis of said pipe lying in said plane of said vane, and with said second end of said vane near the projection of said longitudinal axis of said pipe, to thereby form a complete propellant management arrangement affixed to said first portion of said coupling region at said attachment end of said feed pipe;

placing said complete propellant management arrangement into a mold defining a mold cavity, the shape of which is the desired shape of said tank cavity, with said edge of said vane defining said outer curve spaced away from the walls of said mold cavity by the dimension of said predetermined gap, whereby said second portion of said coupling region of said feed pipe is without said mold cavity;

injecting into said mold cavity the liquid phase of a material having liquid and solid phases, which material is soluble from said solid phase;

solidifying said material and removing said mold from around the solidified material to produce a mandrel affixed to said first portion of said coupling region at said attachment end of said feed pipe, said mandrel having the desired shape of said tank cavity, said vane and said coupling portion of said feed pipe being embedded in which mandrel;

if necessary for a following plating step, applying an electrically conductive material to the outer surface of said mandrel;

coating a ductile metal tank liner onto said mandrel and said second portion of said coupling region of said feed pipe to thereby form said tank liner including a neck portion extending onto said second portion of said coupling region of said feed pipe;

applying a composite reinforcing shell to the exterior of said ductile metal tank liner, and at least part of said neck portion; and flowing a solvent through said feed pipe to dissolve said material, thereby leaving said tank cavity with said vane spaced therefrom by said predetermined gap.

2. A method according to claim 1, wherein:

said step of producing a metal feed pipe includes the step of producing said feed pipe with an integral annular ring protruding outwardly from said cylindrical outer surface portion of said first portion of said coupling region of said pipe; and said step of plating a ductile metal tank liner includes the step of plating said tank liner over said annular ring.

3. A method according to claim 1, further comprising the step of:

before said step of injecting into said mold cavity, inflating a balloon within said mold cavity to reduce the amount of said material required to form said mandrel;

4. A method according to claim 1, wherein said step of forming a propellant management vane includes the step of forming a support arrangement projecting from said edge of said outer curve adjacent said second end of said vane; and said step of placing said complete propellant management arrangement into a mold defining a mold cavity, with said edge of said outer curve of said vane spaced away from the walls of said mold cavity by said predetermined gap, includes the step of juxtaposing said support arrangement with a recess in said mold cavity, whereby said support arrangement protrudes above the adjacent surface of said mandrel and may be plated over in said plating step.

5. A method according to claim 1, wherein said coating step includes the step of plating.

6. A method according to claim 5, wherein said step of plating includes the step of electroplating.

7. A method according to claim 1, wherein:

said step of injecting into said mold cavity includes the step of injecting into said mold cavity LEXAN heated to liquefaction; and said step of solidifying includes cooling said material.

8. A method according to claim 1, wherein said step of applying an electrically conductive material includes one of the steps of (a) sputtering said conductive material onto said outer surface of said mandrel, (b) evaporating said conductive material onto said outer surface of said mandrel, and (c) electroless deposition of said conductive material onto said outer surface of said mandrel.

9. A method according to claim 1, wherein said step of plating a ductile metal includes the step of plating copper.

10. A method according to claim 9, wherein said step of plating copper includes the step of discontinuing plating when the thickness of said copper reaches about 0.01 inch.

11. A method according to claim 1, wherein said step of applying a composite reinforcing shell to the exterior of said ductile metal tank liner includes the steps of:

winding reinforcing fiber tape about said metal tank liner; and impregnating said tape with uncured resin.

12. A method according to claim 11, wherein said step of impregnating said tape follows said step of winding.

13. A tank defining a fluid storage cavity, said tank comprising:

a feed pipe defining a longitudinal axis, a bore and an outer surface, and including a coupling region at an attachment end of said outer surface, said coupling region including a first portion of said outer surface adjacent said attachment end of said feed pipe, and a second portion of said outer surface remote from said coupling end;

a propellant management vane lying generally in a plane, and, in said plane, being generally curved in a shape, the edges of which shape define an attachment end and a second end remote from said attachment end, and inner and outer curves extending between said attachment and second ends, said vane being attached at said attachment end to said first portion of said coupling region of said feed pipe with said longitudinal axis of said pipe lying in said plane;

a ductile metal tank liner surrounding said vane and attached to said feed pipe in said second portion of said coupling region, said metal tank liner being, at regions between said attachment end and said second end of said vane, spaced away from said outer curve of said vane by a predetermined gap; and a reinforcing shell surrounding said tank liner and at least part of said coupling region of said feed pipe.

14. A tank according to claim 13, wherein said reinforcing shell is of a composite material.

15. A tank according to claim 13, further comprising second support means located near said second end of said vane, for connecting said second end of said vane to at least said tank liner for helping to maintain said gap.

16. A tank according to claim 13 wherein said metal tank liner is copper.

17. A spacecraft, comprising:
   a body;
   an engine affixed to said body;
   a propellant tank affixed to said body, said propellant tank defining a propellant storage cavity, said tank further comprising
   a feed pipe defining a longitudinal axis, a bore and an outer surface, and including a coupling region at an attachment end of said outer surface, said coupling region including a first portion of said outer surface adjacent said attachment end of said feed pipe, and a second portion of said outer surface remote from said coupling end;
   a propellant management vane lying generally in a plane, and, in said plane, being generally curved in a shape, the edges of which shape define an attachment end and a second end remote from said attachment end, and inner and outer curves extending between said attachment and second ends, said vane being attached at said attachment end to said first portion of said coupling region of said feed pipe with said longitudinal axis of said pipe lying in said plane;
   a ductile metal tank liner surrounding said vane and attached to said feed pipe in said second portion of said coupling region, said metal tank liner being, at regions between said attachment end and said second end of said vane, spaced away from said outer curve of said vane by a predetermined gap; and
   a reinforcing shell surrounding said tank liner and at least part of said coupling region of said feed pipe; and plumbing coupled to said feed pipe and to said engine for allowing the flow of propellant thereto.

* * * * *